United States Patent
Bhardwaj et al.

(10) Patent No.: US 8,365,113 B1
(45) Date of Patent: Jan. 29, 2013

(54) FLOW METHODOLOGY FOR SINGLE PASS PARALLEL HIERARCHICAL TIMING CLOSURE OF INTEGRATED CIRCUIT DESIGNS

(75) Inventors: Vivek Bhardwaj, New Delhi (IN); Oleg Levitsky, San Jose, CA (US); Dinesh Gupta, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 174 days.

(21) Appl. No.: 12/708,530

(22) Filed: Feb. 18, 2010

Related U.S. Application Data

(63) Continuation-in-part of application No. 12/437,096, filed on May 7, 2009, and a continuation-in-part of application No. 11/621,915, filed on Jan. 10, 2007, now Pat. No. 7,926,011.

(60) Provisional application No. 61/265,705, filed on Dec. 1, 2009.

(51) Int. Cl.
G06F 17/50 (2006.01)

(52) U.S. Cl. ........ 716/106; 716/104; 716/105; 716/108; 716/113; 716/118; 716/124; 716/132; 716/134; 716/139

(58) Field of Classification Search .................. 716/104, 716/105, 106, 113, 118, 132, 134, 139
See application file for complete search history.

(56) References Cited

U.S. PATENT DOCUMENTS

| | | | |
|---|---|---|---|
| 5,793,693 A * | 8/1998 | Collins et al. ............ 365/230.01 |
| 6,099,584 A | 8/2000 | Arnold et al. |
| 6,305,001 B1 * | 10/2001 | Graef ........................... 716/105 |
| 6,578,183 B2 | 6/2003 | Cheong et al. |
| 6,622,290 B1 * | 9/2003 | Ginetti et al. ................. 716/113 |
| 6,651,235 B2 | 11/2003 | Dai et al. |
| 6,658,628 B1 * | 12/2003 | Landy et al. .................. 716/103 |
| 6,678,644 B1 | 1/2004 | Segal |
| 6,817,005 B2 | 11/2004 | Mason et al. |
| 6,845,494 B2 * | 1/2005 | Burks et al. ................... 716/108 |
| 6,865,726 B1 * | 3/2005 | Igusa et al. .................... 716/105 |
| 6,968,514 B2 * | 11/2005 | Cooke et al. ................... 716/102 |
| 7,103,863 B2 * | 9/2006 | Riepe et al. .................... 716/113 |
| 7,143,367 B2 | 11/2006 | Eng |
| 7,356,451 B2 * | 4/2008 | Moon et al. ..................... 703/19 |
| 7,401,243 B2 * | 7/2008 | Knepper et al. .............. 713/322 |
| 7,467,367 B1 | 12/2008 | Li et al. |
| 7,720,107 B2 * | 5/2010 | Bhattacharya et al. ....... 370/503 |
| 7,962,886 B1 * | 6/2011 | Pandey et al. ................. 716/136 |
| 2004/0003360 A1 | 1/2004 | Batchelor et al. |
| 2004/0078767 A1 * | 4/2004 | Burks et al. ....................... 716/8 |
| 2006/0171234 A1 * | 8/2006 | Liu et al. ................... 365/230.03 |
| 2012/0095746 A1 * | 4/2012 | Rao et al. ........................ 703/14 |

OTHER PUBLICATIONS

Spyrou, A. "Method and Apparatus for Circuit Simulation Using Parallel Computing." U.S. Appl. No. 11/766,775. Jun. 12, 2007.
Levitsky. "System and Method of Generating Hierarchical Block-level Timing Constraints from Chip-Level Timing Constraints." U.S. Appl. No. 11/621,915, Jan. 10, 2007.
Bhardwaj. "User Interface for Timing Budget Analysis of Integrated Circuit Designs." U.S. Appl. No. 12/437,096. May 7, 2009.
Rossoshek, Y. Office Action for U.S. Appl. No. 11/621,915. Apr. 8, 2009. pp. 1-13.

* cited by examiner

*Primary Examiner* — Helen Rossoshek
(74) *Attorney, Agent, or Firm* — Alford Law Group, Inc.; William E. Alford

(57) ABSTRACT

In one embodiment of the invention, a method includes partitioning an integrated circuit design into a hierarchy of a top level and a plurality of partitions, wherein the top level includes a top level netlist and each partition includes a partition netlist; receiving data path timing budgets and clock path timing budgets for each of the plurality of partitions of the integrated circuit design; and generating a timing budget model of each partition in response to the respective data path timing budgets and clock path timing budgets, wherein each timing budget model includes an intra-partition clock timing constraint for each respective partition for independent implementation of the top level.

31 Claims, 9 Drawing Sheets

FLOW METHODOLOGY FOR SINGLE PASS PARALLEL HIERARCHICAL TIMING CLOSURE OF INTEGRATED CIRCUIT DESIGNS

CROSS-REFERENCE TO RELATED APPLICATIONS

This non-provisional United States (U.S.) patent application claims the benefit of U.S. Provisional Patent Application No. 61/265,705 entitled FLOW METHODOLOGY FOR SINGLE PASS PARALLEL HIERARCHICAL TIMING CLOSURE OF INTEGRATED CIRCUIT DESIGNS filed on Dec. 1, 2009 by inventors Vivek Bhardwaj et al.; and is a continuation in part and claims the benefit of pending U.S. patent application Ser. No. 12/437,096 entitled USER INTERFACE FOR TIMING BUDGET ANALYSIS OF INTEGRATE CIRCUIT DESIGNS filed on May 7, 2009 by inventors Vivek Bhardwaj et al., incorporated by reference. This patent application is also continuation in part and claims the benefit of pending U.S. patent application Ser. No. 11/621,915, entitled SYSTEM AND METHOD OF GENERATING HIERARCHICAL BLOCK-LEVEL TIMING CONSTRAINTS FROM CHIP-LEVEL TIMING CONSTRAINTS filed by Levitsky et al. on Jan. 10, 2007, hereby incorporated by reference.

This patent application hereby incorporates by reference U.S. Pat. No. 7,467,367 entitled METHOD AND SYSTEM FOR CLOCK TREE SYNTHESIS OF AN INTEGRATED CIRCUIT filed by inventors Li et al., issued on Dec. 16, 2008; and U.S. patent application Ser. No. 11/766,775 entitled METHOD AND APPARATUS FOR CIRCUIT SIMULATION USING PARALLEL COMPUTING filed by inventors Athanasius W. Spyrou on Jun. 12, 2007, pending.

FIELD OF THE INVENTION

The embodiments of the invention generally relate to design methods for timing closure of integrated circuit designs.

BACKGROUND OF THE INVENTION

Integrated circuits have become larger and more complex to provide additional functionality and/or improved performance. The task of designing these integrated circuits is also very complex and time consuming, involving synthesizing, analyzing and optimizing many circuit parameters. Because of this complexity, electronic design automation (EDA) systems have been developed to assist designers in developing integrated circuit designs at multitude levels of abstraction.

To ease the design of a complex integrated circuit, design tasks may be divided up into multiple functional blocks with a plurality of levels of hierarchy. However, dividing up an integrated circuit design into multiple blocks and hierarchical levels can complicate the evaluation of the overall circuit design. Moreover an integrated circuit design may be so large in size or scale (e.g., 1 million gates or more), each partition may have numerous signal paths (e.g., hundreds of thousands of signal paths for data, address, control, and clock signals) and numerous input, output, or input/output ports (e.g., thousands of ports).

With giga gate (e.g., 1 billion gates or more) scale integrated circuit designs, robust hierarchical solutions to analyzing integrated circuit designs become even more important. Limits of computer capacity have bound chip designers to implement giga gate chip designs hierarchically. However, dividing the semiconductor chip hierarchically and implementing it through software is a complex and involved process. The added prototyping complexity involved can be justified if the implementation process yields quick turnaround times without extra iterations or repetition in the design flow process. With a giga gate chip design, hierarchical design becomes the preferred choice, but fast turnaround times in chip closure remains a factor to reckon with.

Timing budgets for data paths are usually automatically generated in early design stages when the integrated circuit design may be incomplete or have errors so that generated timing budgets may require manual correction and analysis. The process of automatic timing budgeting is usually focused on data paths and overlooks the clock paths. The timing budgeting for data paths for a partition may have assumed that the timing in the clock path would not influence the data paths. However, the load on a clock path within a partition may by significant such that the clock path also requires time budgeting across partitions.

Thus, there is a need for an apparatus, systems, and methods for time budgeting of both clock paths and data paths in hierarchical integrated circuit designs so that timing goals of an integrated circuit design may be met.

SUMMARY OF THE INVENTION

While a summary of the invention is provided here, the embodiments of the invention are best summarized by the claims that follow below.

In brief, embodiments of the invention provide a new timing model for the partitions, blocks, and cells that considers the timing delays in the clock paths to allow independent but parallel timing analysis between blocks and the top level of the chip. Time budgeting of clock paths is performed along with the time budgeting of data paths.

Figure 1:
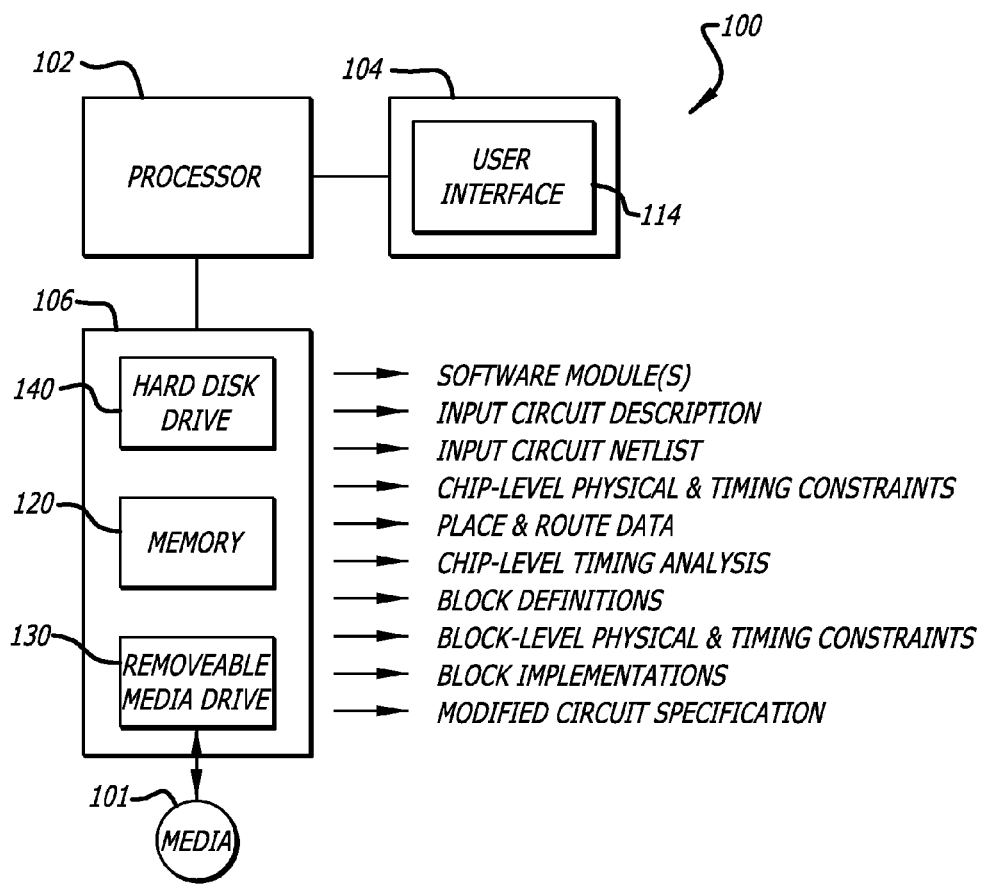
FIG. 1 illustrates a block diagram of an exemplary system for designing integrated circuits including a design flow for timing closure.

DETAILED DESCRIPTION OF THE
EXEMPLARY EMBODIMENTS

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Introduction

The embodiments of the invention facilitate budgeting of clock signal timing between functional blocks or modules of an integrated circuit design as part of the time budgeting flow or methodology. Time budgeting divides the time for a data signal to propagate along the data path across block boundaries. In this case, time budgeting also divides the time for the clock signal (clock division) to propagate along the clock paths across block boundaries. That is, the embodiments of the invention facilitate budgeting of clock timing along with the budgeting of existing data or signal timing. The clock budget timing may be modeled in the timing models for blocks with synchronized or clocked circuits. An improved design flow may implemented that provides a single parallel shot with little to no manual intervention, re-budgeting or serialization.

Time budgeting of data paths (data time budgeting) was described previously in U.S. patent application Ser. No. 11/621,915, entitled SYSTEM AND METHOD OF GENERATING HIERARCHICAL BLOCK-LEVEL TIMING CONSTRAINTS FROM CHIP-LEVEL TIMING CONSTRAINTS filed by Levitsky et al. on Jan. 10, 2007, hereby incorporated by reference. U.S. patent application Ser. No. 11/621,915 describes embodiments that generate block-level timing constraints of data paths for each block-level circuit that may be used to budget timing within an integrated circuit design to functional modules or blocks as part of the timing budgeting process. Timing budgeting of the data paths allows partitioning an integrated circuit design into separate blocks or modules (partitions) and performing a stand alone optimization of each based on the generated constraints, including timing constraints.

Timing budgeting is a part of the block implementation/design in the IC design flow or sequence that allows generating timing and physical constraints for each partition (e.g., module, block, etc.) of an integrated circuit design, prior to completing the physical design.

For clock time budgeting, a total chip clock delay at the top level of hierarchy is divided up amongst the partitions in parallel with the data time budgeting of the data signal paths. Given a clock delay number that represents a delay within the block, the time budgeting module breaks the total chip clock delay into external clock delay and internal clock delay across the partition boundary. The time budgeting module defines the external clock delay as a source latency in the block constraint file. The budgeting module defines the internal clock delay as a network latency in the block constraint file. The budgeting module further defines or puts the internal clock delay number in the block timing model.

A high level logic synthesis tool translates a high level description of a circuit into a gate level netlist and maps logic gates of a cell library therein to form a flattened gate level netlist of the entire circuit, referred to as a chip netlist or a chip-level netlist. A timing analysis with a timing simulator may be used to verify that chip level timing constraints are being met by the chip level netlist. Partitioning and timing budgeting may be performed on the chip level netlist. With the chip level netlist being partitioned and timing budgeting performed, further implementation by logic synthesis and timing analysis may be independently applied to a hierarchy of an integrated circuit design.

In one embodiment of the invention, a method of designing an integrated circuit is disclosed. The method includes partitioning an integrated circuit design into hierarchy of a top level and a plurality of partitions, wherein the top level includes an initial top level netlist and each partition includes an initial partition netlist; receiving data path timing budgets and clock path timing budgets for each of the plurality of partitions of the integrated circuit design; and generating a timing budget model of each partition in response to the respective data path timing budgets and clock path timing budgets, wherein each timing budget model includes an intra-partition clock timing constraint modeled with data path timing constraints for each respective partition for independent implementation of the top level.

In another embodiment of the invention, a method for integrated circuit design and analysis is disclosed. The method includes identifying clock entry points at a partition boundary of each partition of an integrated circuit; analyzing one or more inner clock paths from each clock entry point to one or more clock sinks within each partition; estimating clock timing delay along each inner clock path; selecting a value of clock timing delay for each clock entry point; setting clock timing constraints for each partition in response to the selected clock timing delay; and modeling the data paths and the one or more inner clock paths in the partition with a merged data and clock constraint timing graph.

In another embodiment of the invention, a circuit design system is disclosed. The circuit design system includes a first computer to execute instructions, the first computer including a first storage device to store instructions for execution; and a second computer to execute instructions independently of the first computer, the second computer including a second storage device to store instructions for execution. The first storage device having instructions stored therein to adapt the first computer to receive a top level netlist of a top level of a partitioned integrated circuit design, receive a plurality of merged data and clock constraint timing graphs to respectively model a plurality of partition blocks in response to data and clock time budgeting, and optimize the top level netlist in response to the plurality of merged data and clock constraint timing graphs to design the top level without waiting for implementation of any partition. The second storage device having instructions stored therein to adapt the second computer to receive a first partition block netlist of a first partition block in a lower level hierarchy of the integrated circuit design, receive a first clock timing constraint for the first partition block in response to the data and clock time budgeting, and optimize the first partition block netlist to design the first partition block.

The first computer and the second computer may be collocated in the same local area and coupled together by a local area network so that the top level and the first partition block are independently designed concurrently in parallel. Alternatively, the first computer and the second computer may be in different locations, such as in different buildings, cities, states, countries and coupled together by a wide area network where the top chip level and the first partition block may still be independently designed concurrently in parallel.

The circuit design system may further include a third computer to execute instructions independently of the first computer and the second computer. The third computer includes storage device to store instructions for execution where the third storage device having instructions stored therein to adapt the third computer to receive a second partition block netlist of a second partition block in the lower level hierarchy of the integrated circuit design, receive a second clock timing constraint for the second partition block in response to the data and clock time budgeting, and optimize the second partition block netlist to design the second partition block.

In still another embodiment of the invention, a machine readable product for designing an integrated circuit is disclosed. The machine readable product comprises a machine readable storage device having stored therein machine readable instructions. The machine readable instructions, when executed by a machine such as a processor, function to receive a chip level clock latency from clock source to clock sink; perform clock time budgeting along a clock path to split the chip level clock latency into a clock source latency and an intra partition clock latency to form clock path constraints for a plurality of partition blocks; and perform a first optimization of a plurality of partition block netlists of the plurality of partition blocks respectively in response to data path constraints and the clock path constraints for the plurality of partition blocks before synthesizing a clock tree of a plurality of clock paths from the clock source to a plurality of clock sinks. Prior to the first optimization of the plurality of partition block netlists, a plurality of timing budget models may be generated respectively for each of the plurality of partition blocks in response to data path constraints and the clock path constraints respectively thereof. After the first optimization, a clock tree may be synthesized into the top level netlist and the plurality of partition block netlists in response to the top level timing constraints and the timing budget models for the plurality of partition blocks, and a second optimization may be performed on the plurality of partition block netlists of the plurality of partition blocks respectively in response the clock tree and the data path constraints and the clock path constraints for the plurality of partition blocks. The plurality of partition block netlists of the plurality of partition blocks after the second optimization may be the same as those after the first optimization if the budgeted timing constraints and timing budgets are relatively accurate.

Circuit Design System

FIG. 1 illustrates a block diagram of an exemplary circuit design system 100 for designing integrated circuits in accordance with an embodiment of the invention. As discussed in more detail below, the circuit design system 100 is capable of generating timing constraints for individual hierarchical blocks of an integrated circuit that are derived from the chip-level timing constraints and analysis. Using the chip-level timing constraints and analysis, the circuit design system 100 is capable of generating block-level timing constraints for module or block-level circuits as well as other constraints for time budgeting. The block-level timing constraints may be in the form of one or more logical timing constraint points associated with ports of a block-level circuit. The block-level timing budgeting data may be propagated to the timing budgeting data of other modules and blocks in the hierarchy of the integrated circuit so that when the blocks are finally assembled together to form the entire chip, timing closure for the entire chip can be achieved.

The circuit design system 100 may be configured as one or more computer systems comprising one or more processors 102, an input/output interface 104, and one or more storage devices 106. The one or more processors 102 may be any type of data processing device, including microprocessors, microcontrollers, reduced instruction set computer (RISC) processors, networked computer systems, etc or a specialized processor for performing integrated circuit design. The one or more storage devices 106 may be any one or more computer readable mediums include memory devices 120, storage media 101 readable by a removable media drive 140, and/or a hard disk drive 140 (e.g., RAM, ROM, magnetic hard disks, optical storage discs, etc.) for storing one or more software modules of instructions that control the processor 102 to perform its various operations. The one or more storages devices 106 may store information (e.g., circuit netlist, constraints, etc.) as well that the processor 102 uses in performing the circuit design process described herein. Such information may include the input circuit description specified by a user, the input circuit netlist generated by a logic synthesis operation, the chip-level physical and timing constraints, place and route data including chip-level timing analysis generated by a place and route operation, block definitions including block-level physical and timing constraints generated by a chip partitioning operation, block implementations generated by a block implementation operation, and the modified circuit specification generated by a chip assembly and top-level implementation operation, and verified by a circuit sign-off verification operation. Use of a plurality of computer systems over a network for circuit simulation of blocks in parallel is further described in U.S. patent application Ser. No. 11/766,775 entitled METHOD AND APPARATUS FOR CIRCUIT SIMULATION USING PARALLEL COMPUTING filed by inventors Athanasius W. Spyrou on Jun. 12, 2007, Under the control of instructions of one or more software modules stored in the one or more storage devices 106, the one or more processors 102 may perform the various operations of the circuit design system 100, including logic synthesis, chip-level floor planning, place and route, chip partitioning, block implementation, top-level implementation, chip assembly, and circuit sign-off verification.

The input/output interface 104 allows a user to send and receive information to and from the processor 102, as well as control the various operations performed by the processor 102. For example, the input/output interface 104 may comprise one or more input devices, such as a keyboard, a pointing device (e.g., a mouse, a track ball), a touch-sensitive display, microphone, etc. The input/output interface 104 may also comprise one or more output devices, such as a display (including a touch-sensitive display) driven by a graphics generator, speakers driven by an audio generator, etc.

Using the one or more input devices of the input/output interface 104, a user may specify an input circuit description in any of a number of formats, including in a hardware description language (HDL), such as VHDL or Verilog, or in a resistor-transistor logic (RTL) language. Using one or more output devices of the input/output interface 104, a user may view the results of the circuit design operation performed by the processor 102. The user may also control the circuit design operations performed by the processor 102 using the input/output interface 104.

Figure 7:
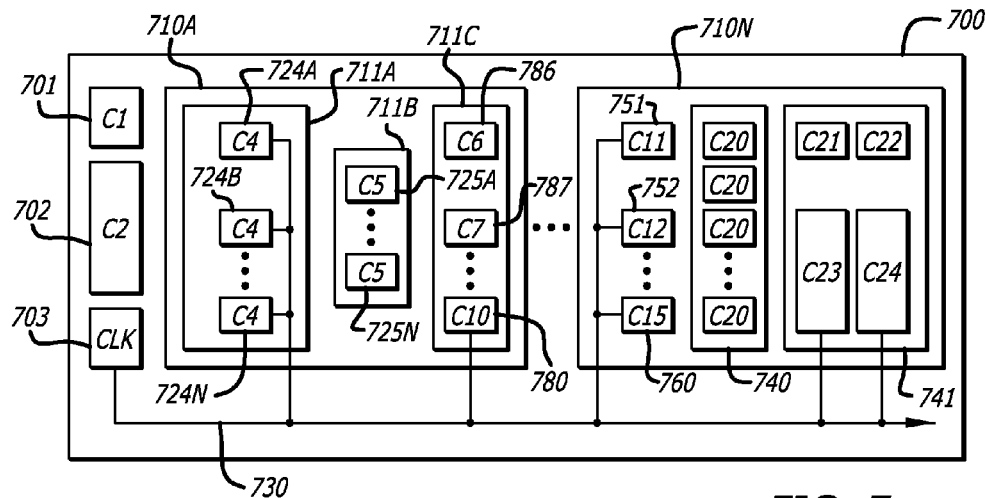
FIG. 7 illustrates a block diagram of an exemplary integrated circuit design depicting an exemplary hierarchy of instantiation.
Figure 8:
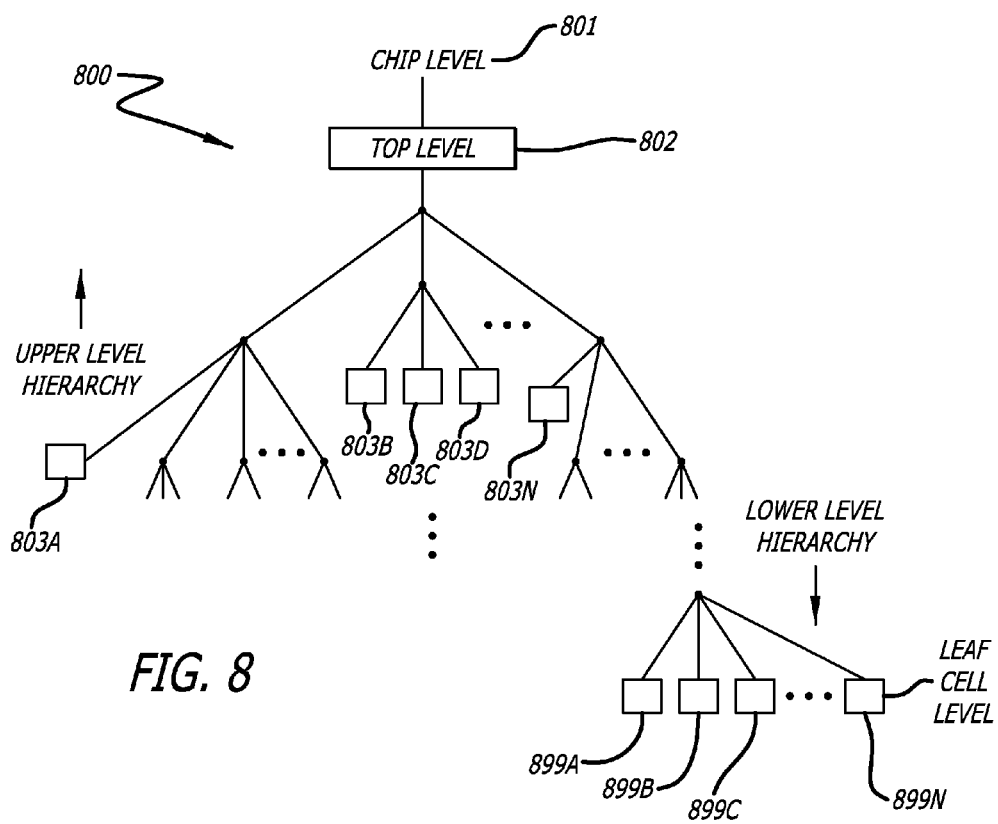
FIG. 8 illustrates an exemplary tree diagram of an integrated circuit design illustrating different levels of hierarchy.

The timing budgeting graphical user interface (GUI) 114 is displayed graphically in a graphics window on a display device (one of the input/output devices 104, e.g., liquid crystal display or cathode ray tube display) for viewing by a user and to interact with the user using other input devices (e.g., a mouse, with mouse buttons, and a graphical pointer generated by a graphics generator). Instructions stored in the one or more storage devices 106, when executed by the processor 102, may generate the timing budgeting graphical user interface (GUI) 114 for one or more blocks/modules in response to one or more of the partitioning of the chip level netlist, chip-level design constraints (e.g., timing constraints, physical constraints, etc.), a timing library for the standard circuit cells in the IC design, timing models for macros/black boxes in the IC design, if any, a chip floorplan, and an initial placement data of cells and an initial route data of wire nets, if available.
Chip Hierarchy Referring now to FIG. 7, the embodiments of the invention are used to design an integrated circuit, such as an exemplary integrated circuit 700. The integrated circuit 700 can be represented in a number of different ways such as a flattened chip or a tree hierarchy of different levels of circuits. One representation of the integrated circuit 700 is by a hierarchical netlist with different levels of hierarchy including a top level with one or more types of partitions (e.g., macro-blocks, modules or partitions (also referred to as upper-level blocks), blocks, sub-blocks, and leaf-cells or gates) at lower block levels instantiated therein. The levels of hierarchy often include a top level 802; one or more block-levels 803A-803N, and a cell, gate or leaf level 899A-899N as illustrated in the exemplary hierarchy tree of FIG. 8. The cells at the leaf level 899A-899N of hierarchy may include transistors that may make up one or more logical gates.

The top-level 802 of the hierarchy of the integrated circuit 700 may include one or more cells 701-703, one or more upper-level blocks 710A-710N, and top level interconnect 730, for example. At the one or more block levels 803A-803N, the upper level block 710A may include one or more lower level blocks 711A-711C. At the one or more block levels 803A-803N, the upper level block 710N may include one or more cells 751-760 and one or more lower level blocks 740-741. The lower level blocks may include additional blocks or leaf cells at leaf cell levels 899A-899N. For example, blocks 711A-711C respectively include leaf cells 724A-724N; leaf cells 725A-725N, and leaf cells 726-730. In a block, the same leaf cell may be instantiated numerous times, such as a D flip flop to make up a register, for example. In block 711A, the same cell C4 is instantiated N times as leaf cells 724A-724N. In another block, different leaf cells may be instantiated depending upon the desired logical functionality.

Alternatively, the integrated circuit 700 may be represented by a flattened chip level netlist of leaf-cells or gates without any added levels of hierarchy. Instead of a block level hierarchy, a flattened netlist may be used so that all design details of the integrated circuit are visible at the chip level 801.

A flattened chip level netlist of an integrated circuit 700 is typically used to perform chip-level timing analysis as entire data paths with their delay elements are more visible. However, timing closure by an EDA tool may be more difficult to obtain with a flattened chip level netlist on an entire integrated circuit. Additionally, one computer system is typically used to perform a timing analysis on a flattened chip level netlist, as it is difficult to share the computational load of a flattened chip level netlist with other networked computers. With a limited amount of computer resources, the time to perform a timing analysis of an entire integrated circuit chip may be quite long given today's complicated integrated circuits. In contrast with a hierarchical netlist of an integrated circuit, block-level timing analyses can be independently performed on a block by block basis using block level timing requirements and a top level timing analysis can be performed using the top level interconnect, models of the blocks, and top level circuitry, if any. The block-level timing analyses, the top level analyses, as well as timing budget generation and analyses, can be shared amongst a plurality of networked computer systems so that it can be performed independently in parallel and achieve timing results and timing closure for the overall integrated circuit chip sooner.

Figure 5:
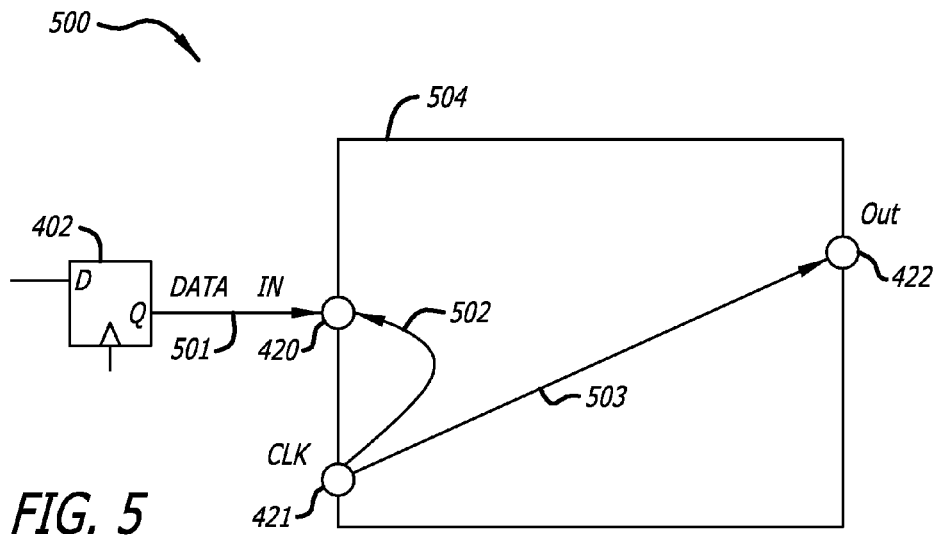
FIG. 5 illustrates an initial timing graph of a data path and a clock path in the exemplary partition.
Figure 6:
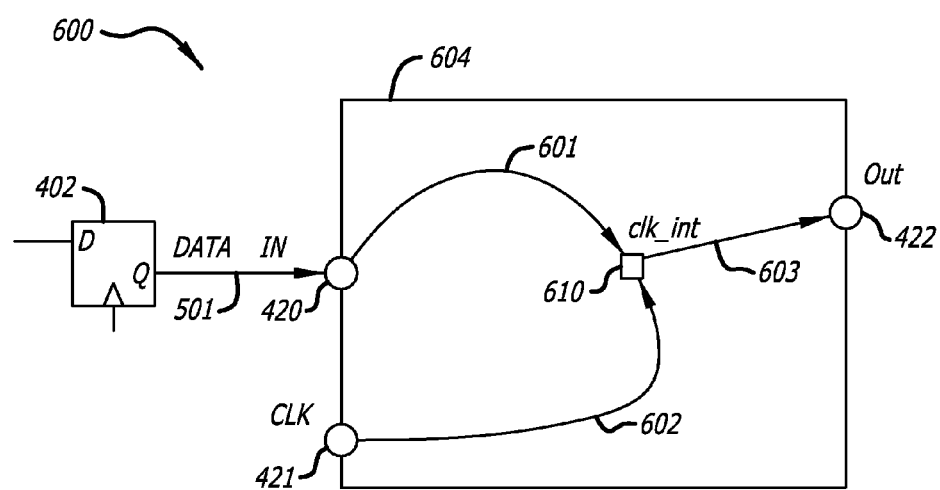
FIG. 6 illustrates a clock delay timing graph of the data path and clock path in the exemplary partition to budget for clock timing in the partition.

To speed the timing analysis at the top level, the blocks may be modeled with a simple timing model, such as by a timing graph shown in FIGS. 5-6, for the purpose of analyzing timing at the top level. The more accurate the timing model of the blocks, the more accurate is the timing analysis of the top level of the integrated circuit.

Figure 2A:
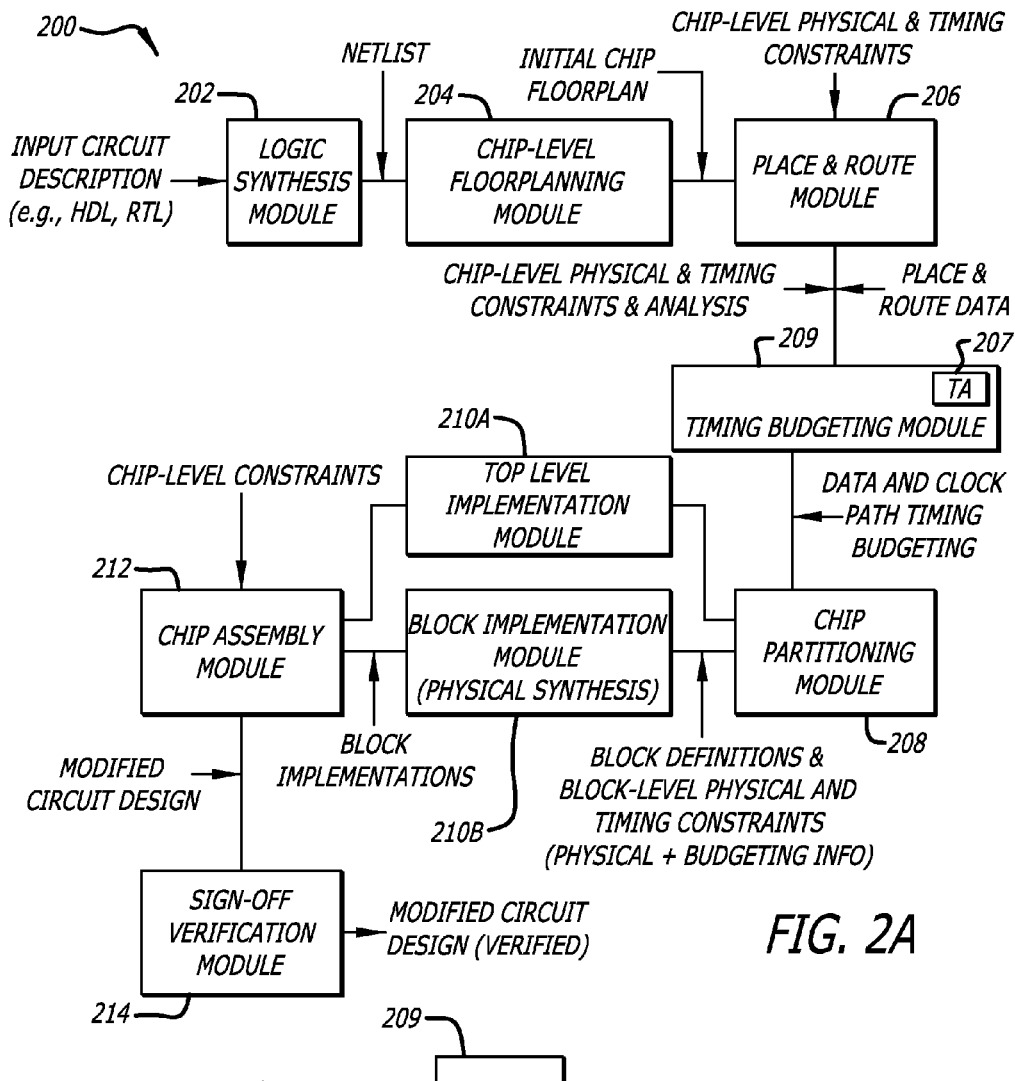
FIG. 2A illustrates a block diagram of exemplary software modules used in an exemplary integrated design system.

The cell 703 may be a clock generator or clock buffer that generates a clock signal CLK 730 that is coupled into one or more partitions, blocks and cells at various levels of hierarchy in the chip. The clock signal 730 may experience various timing delays along the clock path before reaching a logic gate or register within a block. Exemplary timing delays in the clock path are described herein with reference to FIG. 4A and FIG. 9. Previously, the timing model for the blocks may have ignored the timing delays in the clock path or treated it uniformly. Embodiments of the invention provide a new timing model for the partitions, blocks, and cells that considers the timing delays in the clock paths to allow independent timing analysis between blocks and the top level and improve accuracy in the timing analysis thereof.
Software Module System FIG. 2A illustrates a block diagram of an exemplary software suite 200 used by the circuit design system 100 in performing its circuit design function. The software suite 200 includes a logic synthesis module 202, a chip-level floor planning module 204, a place and route module 206, a chip partitioning module 208, a timing budgeting module 209, a top-level implementation module 210A in parallel with a block implementation module 210B, a chip assembly module 212, and a circuit sign-off verification module 214.

The logic synthesis module 202 generates a gate-level netlist from an input circuit description specified by a user using the input/output interface 104 (FIG. 1). The chip-level floorplanning module 204 generates an initial chip floorplan from the gate-level netlist.

The place and route module 206 generates an initial layout for the chip-level circuit using the initial chip floorplan and flat chip-level physical and timing constraints, and flat chip level timing constraints. The flat chip-level physical constraints and flat chip level timing constraints may be specified by a user using the input/output interface 104. Alternatively, the input/output interface 104 or other software module can generate flat chip-level timing constraints. This is ok.

Figure 2B:
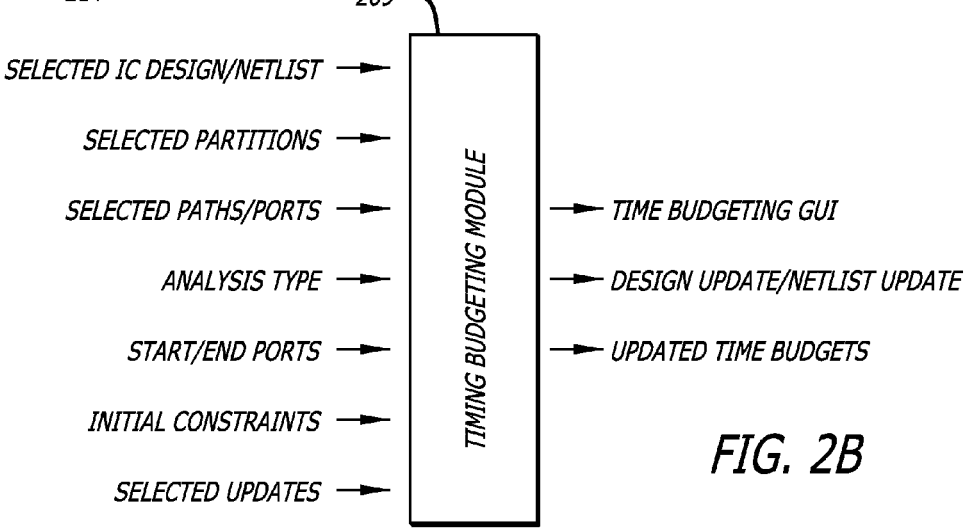
FIG. 2B illustrates a block diagram of an exemplary timing budgeting software module used in the exemplary integrated design system.

FIG. 2B illustrates a block diagram of the timing budgeting software module 209 with exemplary input/outputs. The timing budgeting module 209 generates timing budgets independent of the physical partitioning in response to a timing budget command (deriveTimingBudget). The timing budgeting module 209 may include a timing analysis (TA) module 207 that is called by the timing budgeting module to calculate delays along one or more selected signal paths of an integrated circuit design. The timing budgeting module 209 automatically generates initial time budgets (both data timing budgets and clock timing budgets for each partition) and then analyzes and adjust the initial time budgets for the various levels of hierarchy and blocks in the integrated circuit design, prior to completion of the physical layout. Budgeting information can be saved with a budgeting command (saveTimingBudget) without saving the physical portions of the IC design. While the IC design is being partitioned, in response to a savePartition command, timing budgets may be saved concurrently with the saving of the partitions generated after the physical partitioning module 208 of the IC design.

The chip partitioning module 208 partitions the initial chip layout into a top level and various hierarchical block-level circuits, and generates block-level physical and timing constraints instantiated into the top level. In response to the flat chip-level physical constraints and flat chip level timing constraints, the chip partitioning module 208 generates the top-level physical constraints and top-level timing constraints as well as the block-level physical constraints and block-level timing constraints for each block-level partition.

The block top-level implementation module 210 generates block implementations from the block definitions and block 210A optimizes the top-level netlist in response to the top-level physical and constraints, the top-level timing constraints, and the timing models of the partition blocks generated by the timing budgeting module 209. The timing models of the blocks generated by the timing budgeting module 209 includes timing constraints for both data paths and clock paths in each partition block.

The block implementation module 210B optimizes the block-level netlists (also referred to as block level implementation) in response to the block definitions, the block-level physical constraints, and the block-level timing constraints. The block implementation module 210B and the top level implementation module 210A operate independent of each other so that the top level and the block partitions can be implemented concurrently in parallel.

The chip assembly module 212 assembles the block implementations, together merging them within the top-level to form a flat chip level implementation. The chip assembly module may further optimize the assembled flat chip level implementation using chip-level constraints to generate a modified circuit design.

The sign-off verification module 214 verifies that the modified circuit design performs to the specification of the integrated circuit design.

The chip partitioning module 208 can generate block-level timing constraints for data paths into each block-level circuit that are derived from the flat chip-level timing constraints and analysis. The block-level timing constraints for data paths are in the form of logical timing constraint points (hereinafter referred to as "logical TC points") at the data input and/or output ports of each defined block-level circuit where a data path crosses a partition boundary. Each logical TC point defines a clock source parameter for specifying a clock governing the propagation of data through a data path that passes through the block port, the delay parameter specifying a data propagation delay at the block port associated with a preceding or following block, and any applicable timing exceptions associated with the data path. Using the logical TC points, the block implementation module 210 performs timing analysis and/or optimization on the individual blocks to obtain implementations for the blocks. The derivation of the logical TC points from the chip-level timing constraints ensures that when the implemented blocks are subsequently assembled into the entire chip by the chip assembly and top level implementation module 210, timing closure for the entire chip can be achieved, and verified by the circuit sign-off verification module 212.

Clock ports are different from input and output data ports. A clock port is where a clock signal enters a partition block crossing over the partition boundary. More than one clock signal may enter a partition block so that different circuits may be clocked differently. There is one clock signal per clock port that may result in one or more clock paths between a clock source and one or more respective clock sinks within a partition block.

Clock Time Budgeting with Data Time Budgeting

The timing budgeting module 209 may automatically generate initial data timing budgets and clock timing budges for each partition block. The timing budgeting module 209 may also analyze and adjust the initial time budgets for the various levels of hierarchy and blocks in the integrated circuit design, prior to completion of the physical layout. U.S. patent application Ser. No. 11/621,915, entitled SYSTEM AND METHOD OF GENERATING HIERARCHICAL BLOCK-LEVEL TIMING CONSTRAINTS FROM CHIP-LEVEL TIMING CONSTRAINTS filed by Levitsky et al. on Jan. 10, 2007, incorporated by reference, describes embodiments that generate block-level timing constraints for the data paths in each block-level circuit. Chip level timing constraints are used to automatically generate the initial timing budgets for each of the partitions (e.g., functional modules or blocks) of an integrated circuit design as part of the timing budgeting process.

During the timing budget generation process, the timing budget analysis module 209 generates constraints (physical and timing constraints) for each partition, whether it is a module, a block, or other level of hierarchy in the integrated circuit design, including data path timing constraints and clock path timing constraints. An initial analysis is performed for each partition to determine their ports and check for false paths that may occur due to an improper assertion on the part. The false paths are saved in a first file (e.g., a warning file or .warn file) within a storage device. An initial timing budget analysis is performed to trace selected paths to generate detailed information regarding the path and how the initial timing budget information was automatically assigned. The detailed information regarding the path is saved in a second file (e.g., a justify budgeting file or justifyBudget file) within the storage device. The detailed information may also be generated interactively. A timing budget analyzer may display some of the timing budgeting information contained in the second saved file (e.g., the justify budgeting file) to report it to the user.

Figure 11:
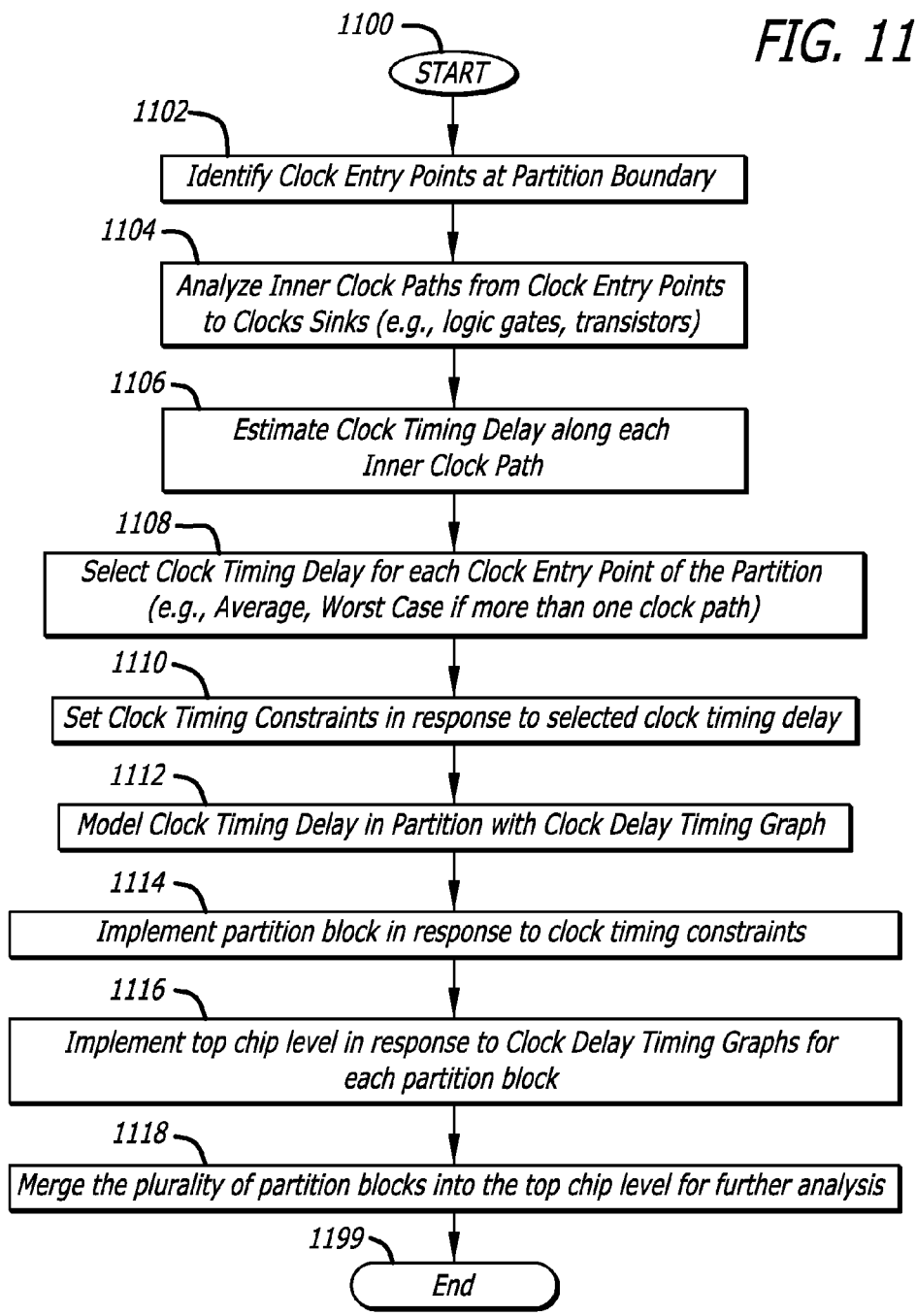
FIG. 11 illustrates a flow chart of an exemplary method of designing in parallel a top chip level and partition blocks on lower levels of a chip hierarchy.

Referring now to FIG. 11, a method of clock timing budgeting is now described with reference to FIGS. 4A-4B, 5-7 including automatic generation of block level timing constraints for the inner clock paths in each block-level circuit. The method starts at process 1100 and then goes to process 1102.

At process 1102, each partition block is analyzed to determine one or more clock entry points (CEP) at the partition boundaries for one or more clock signals used therein.

Figure 4A:
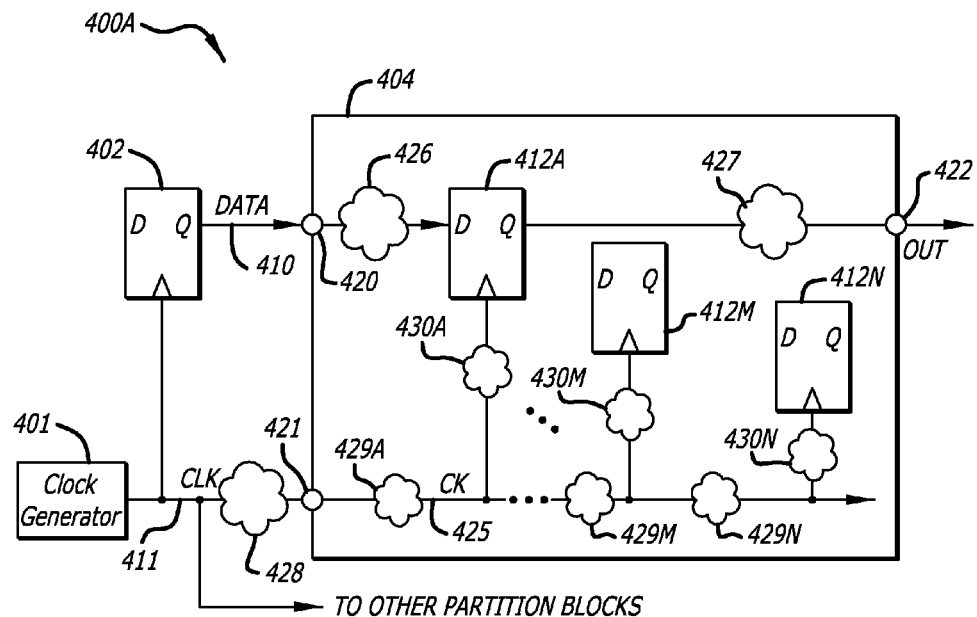
FIG. 4A illustrated an exemplary integrated circuit design partition with data and clock inputs.

Referring now to FIG. 4A, a block diagram of an exemplary partition block 404 is shown. The partition block has a data entry point DEP 420, a clock entry point CEP 421, and a data out point DOP 422 at the partition boundary separating the internal circuits and paths of the partition from external circuits and paths. The entry points 420-422 may also be referred to as pins of the partition block.

A clock generator 401 generates an external clock signal CLK 411 that is coupled into the block 404 at the clock entry point 421. The clock generator 401 may be a simple clock buffer for buffering an input clock signal or a more complex circuit such as a clock oscillator circuit or a phase locked loop (PLL) clock generator to form the external clock signal CLK 411.

The clock paths between the source and the sinks are divided or split up at each clock entry point 421 of the partition block. Conceptually, the total clock delays from chip clock root or source outside the block to the sinks inside the blocks are divided or split into portions outside and inside the block. The clock timing delay portion inside the block is referred to as the intra-partition clock delay. The clock timing delay portion outside the block from the clock source is referred to as the source latency. The value of the intra-partition clock delay within a block may be selectively defined by a user or estimated from a chip-level clock tree, such as described in METHOD AND SYSTEM FOR CLOCK TREE SYNTHESIS OF AN INTEGRATED CIRCUIT filed by Li et al. issued as U.S. Pat. No. 7,467,367. The intra-partition clock delay is used to perform clock budgeting.

At process 1104, inner clock paths are analyzed from the clock entry points to the clock sinks. A clock sink is a logic gate or transistor that receives the clock signal.

Figure 4B:
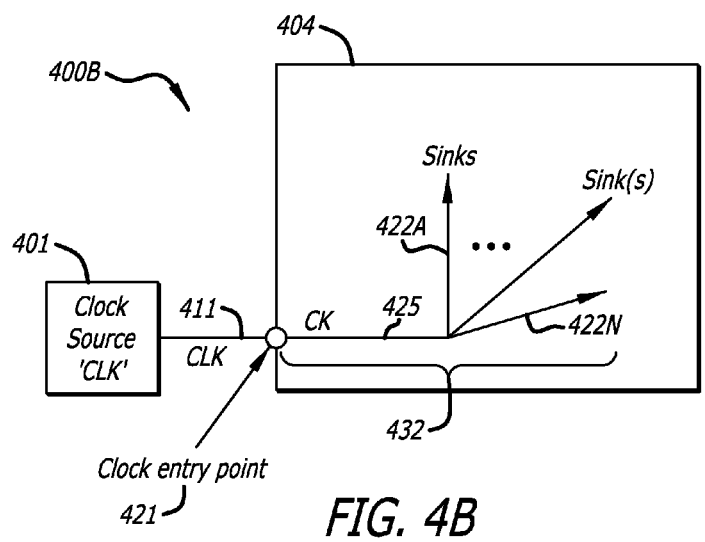
FIG. 4B illustrates an exemplary wire diagram of clock loading.

FIG. 4B schematically illustrates a clock signal path within a partition block. The external clock signal CLK 411 entering into the partition block 404 at the clock entry point CEP 421, becomes the inner clock signal CK 425 and drives the various one or more clock sinks 422A-422N (e.g., clock receiver, clock gated transistor) inside the block 404. The one or more clock sinks 422A-422N may correspond to one or more D flip flops or registers 412A-412N within the block.

Referring back now to FIG. 4A, the external clock signal CLK 411 is coupled into the partition block 404 at the clock entry point CEP 421 becoming the inner clock signal CK 425. The external clock signal CLK 411 may be coupled into other partition blocks within the integrated circuit chip. The external clock signal CLK 411 may pass through some resistor-capacitor parasitic loads and/or combinational logic 428 before being coupled into the partition block 404 at the clock entry point CEP 421. The inner clock signal CK 425 is coupled into the clock input of the D flip-flops/registers 412A-412N. However, before the inner clock signal CK 425 reaches the clock input of the D flip flops/registers 412A-412N, it may pass through resistor-capacitor parasitic loads and/or input digital combinational logic 429A-429N and resistor-capacitor parasitic loads and/or input digital combinational logic 430A-430N.

An external D flip-flop or register 402 (a plurality of D flip-flops in parallel coupled to a bus forming a register), internal to another partition or at a different hierarchical level, generates an external data signal DATA 410. The external data signal DATA 410 is coupled into the block 404 at the data entry point DEP 420.

The external data signal DATA 410 may pass through some resistor-capacitor parasitic loads and/or input digital combinational logic 426 before being input for capture into an internal D flip flop or register 412A. The Q output signal from the internal D flip-flop or register 412A is actively generated upon receipt of an edge of the inner clock signal CK 425. When active, the Q output signal from the internal D flip flop or register 412A may pass through some resistor-capacitor parasitic loads or output digital combinational logic 427 before being output from the block 404 as the output signal OUT at the data out point DOP 422. The partition block 404 may include other internal D flip flops or registers 412B-412N each having their own clock path and data path that may or may not have input digital combinational logic 426 and/or output digital combinational logic 427.

At process 1106, the clock timing delay along each inner clock path is estimated. A clock entry point may have one or more inner clock paths to one or more clock sinks. The clock timing delay from the clock entry point to each clock sink may be estimated as the resistor-capacitor parasitic loads and/or input digital combinational logic along each path may differ.

Figure 9:
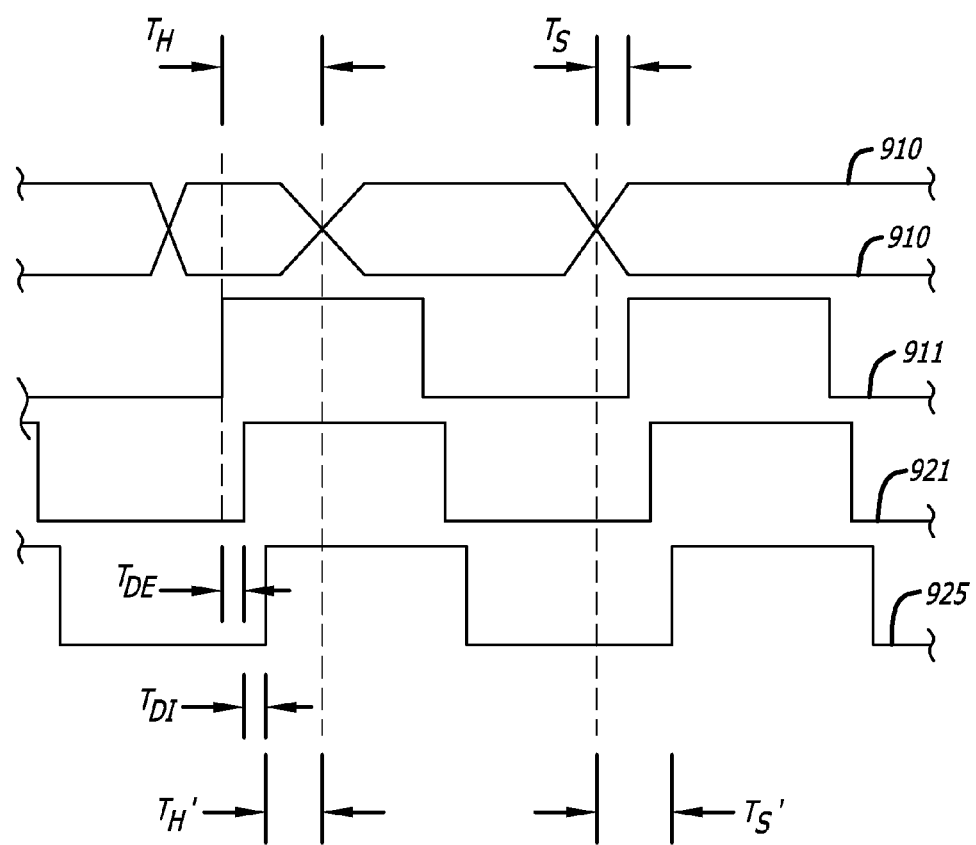
FIG. 9 is a waveform timing diagram illustrating exemplary timing in the clock path with respect to data timing.

FIG. 9 illustrates exemplary timing delays for signals around the exemplary partition block 404. A clock signal waveform 911 is exemplary of a clock signal 411 generated by the clock generator 401. Due to the timing delays from one or more of the resistor-capacitor parasitic loads and/or combinational logic 428, 429A-429N, and 430A-430N in the clock path an exemplary clock signal waveform 925 may be formed representing the internal clock signal CK 425 that is coupled into clock logic or one or more internal D flip flops/registers 412A-412N. A data signal waveform 910 represents timing of an exemplary data signal 410 that may be coupled into a partitioned block.

Without any delay in the clock path, the transistor circuits in a D flip-flop/register 412A-412N will have a setup time Ts and a hold time Th constraint for the data signal with respect to a rising or falling edge of the clock signal clocking the D flip-flop/register, such as that shown between waveforms 910 and 911 in FIG. 9.

External clock timing delay $T_{DE}$ in the clock path 411 external to the partition, due to resistor-capacitor parasitic loads and/or combinational logic 428 or otherwise, results in a delayed clock signal such as exemplified by waveform 921 at the clock entry point 421. An exemplary external clock timing delay $T_{DE}$ is shown between the difference in the timing of edges in the waveforms 911 and 921 of FIG. 9.

Internal clock timing delay $T_{DI}$ in the clock path 425 within a partition, due to resistor-capacitor parasitic loads and/or combinational logic 429A-429N and 430A-430N or otherwise, results in a delayed clock signal such as exemplified by waveform 925. An exemplary internal clock timing delay $T_{DI}$ is shown between the difference in the timing of edges in the waveforms 921 and 925 of FIG. 9.

The delayed clock signal can alter the setup and hold times at a D flip/flop or register within a partitioned block. Assuming the data signal waveform 910 does not change, a delay in the clock signal can alter the setup and hold times, such as a shorter hold time Th' and a greater setup time Ts', as illustrated by the relationship between waveforms 910 and 925 in FIG. 9. Representing the delays in the clock path during clock budgeting can assist in obtaining timing closure of an integrated circuit design sooner.

To estimate the timing delays in the clock paths, the resistor-capacitor parasitic loads and/or input digital combinational logic along each path may be estimated as a function of distance due to placement of the gates and transistors and parasitic capacitance values for the leaf cells of the circuits in a cell library. If the clock paths are routed after the clock tree is synthesized, the parasitic resistances and capacitances may be extracted from the routed clock paths to perhaps obtain a better estimate of the clock timing delay along each clock path.

At process 1108, a clock timing delay is respectively selected for each of one or more clock entry points of each partition block. As mentioned herein, each clock entry path may have multiple clock paths resulting in multiple clock timing delay values for the respective clock entry point. For simplification, a single value is selected to represent the clock timing delay for the multiple paths. If a single path, the value may be based on the single clock timing delay that is determined from the one clock path. In the case of a plurality of clock paths associated with the same clock entry point, the value may be selected based on a heuristic, such as the worst case clock timing delay, an average clock timing delay, or a weighted average clock timing delay of the plurality of clock timing delays.

At process 1110, clock timing constraints are set in response to the selected clock timing delay.

Assume that the nominal clock latency or clock timing delay for the partition block 404 is along an inner clock path CK 432 from the clock entry point CEP 421 to a clock sink S (e.g., sink 422N). The nominal clock latency or delay along this inner clock path CK 432 may also be referred to as the inter partition delay (abbreviated as inter_ptn_delay) and assigned to an inner clock signal pin CK 425 of the partition block. The inter partition delay value may vary from partition block to partition block.

At a top level, there is a given overall chip constraint for clock delay or latency. This top or chip level clock timing constraint has an overall chip target timing latency or delay that may be referred to as chip target delay (abbreviated as chip_target) and assigned to the chip clock signal pin CLK.

The original chip level timing constraint, chip_target, for the clock may be set by the following instruction:
set_clock_latency<chip_target>CLK With the chip level clock timing constraint, clock timing constraints can be written for inner clock signal pin CK of the block 404. The following instructions are written into the block constraint file to set the clock timing constraint for the block 404:
set_clock_latency<inter_ptn_delay>CK
set_clock_latency-source<chip_target-inter_ptn_delay>CK At process 1112, the clock timing delay in each partition is modeled by a new timing graph that considers clock latency or clock timing delays. The new timing graph may be referred to as a merged data and clock constraint (MDCC) timing graph. FIG. 6 illustrates an exemplary merged data and clock constraint timing graph 600 that models data path timing with clock timing constraints. To generate a MDCC timing graph, an initial timing graph may be formed that models data path timing alone.

FIG. 5 illustrates an initial timing graph 500 with a block model 504 that models data path timing and constraints in the partition block 404, before clock time budgeting. The block model 504 includes a timing arc 502 from the clock entry point CEP 421 to the data entry point DEP 420, and a timing arc 503 from the clock entry point CEP 421 to the data out point DOP 422. The timing graph 500 may further include a timing arc 501 to model the input delay along the external data signal DATA 410 from the data output Q of the D flip-flop or register 402 into the block 404 at the data entry point DEP 420.

The timing arc 502 has setup and/or hold timing constraints for the data signal at the data entry point DEP 420 with respect to the clock signal CLK. The timing arc 503 has an internal data signal timing delay constraint for the data path within the partition block 404. However, neither timing arc 502 nor timing arc 503 considers that there may be an inter partition delay in the clock path. The partition block model 504 may be updated to take into consideration the inter partition delay through clock time budgeting.

Referring now to FIG. 6, a MDCC timing graph 600 including a partition block model 604 for clock time budgeting is illustrated. Like the timing graph 500, the MDCC timing graph 600 may further include the timing arc 501 to model the input delay along the external data signal DATA 410 from the data output Q of the D flip-flop or register 402 into the block 404 at the data entry point DEP 420.

To take into consideration the inter partition delay through clock time budgeting, a new internal timing pin 610 (may be referred to as an internal clock time budgeting pin (clk_int) 610) is introduced within the partition block model 604. Replacing the timing arc 502 of FIG. 5 are an internal clock timing arc 602 and an internal data input timing arc 601. The internal clock timing arc 602 is formed from the clock entry point CEP 421 to the internal clock time budgeting pin 610. The internal data input timing arc 601 is formed from the data entry point DEP 420 to the internal clock time budgeting pin 610. The timing arc 503 of FIG. 5 is replaced by a data output timing arc 603 and the internal clock timing arc 602. The data output timing arc 603 is formed from the internal clock time budgeting pin 610 to the data output point DOP 422. The timing arcs may also be referred to as timing vectors. The timing arcs may be replaced with intra-partition delay characterization. That is, the timing arcs can be modeled or characterized for the budgeted/estimated timing delays for both the data paths and the clock paths into and out from the partition block.

The arrival timing arc 601 includes the arriving combinational logic delays or arriving constraint checks (e.g., setup time, hold time). The outgoing timing arc 603 includes the outgoing combinational logic delays. The internal clock timing arc 602 has an estimated partition clock latency. If parasitic resistances and capacitances are extracted from the building of clock buffer tree with a clock tree synthesis tool, a more substantial real partition clock latency may be associated with the internal clock timing arc 602 instead.

The internal clock timing arc 602 has a latency or delay (intra-partition clock latency) corresponding to the clock intrapartition delay time (intra_ptn_delay or IPD). The timing constraint of the data output timing arc 603 may be that of the timing arc 503 but adjusted for the delay (intra_ptn_delay or IPD) of the internal clock timing arc 602. The internal data input timing arc 601 has a data delay corresponding to the budged data delay, including the setup time for the data path. As shown by the arcs in FIG. 6, the intra-partition clock latency associated with the internal clock timing arc 602 has an effect on timing of the data paths involving the internal data input timing arc 601 and the data output timing arc 603.

The timing graph 600, also referred to as a timing budget model or timing budget abstraction, may be used to model timing of each partition block at the top level so that data path timing requirements are met during timing analysis at a top level, including the influence that the intra-partition clock latency may have on timing of the data path. That is, the data path timing is responsive to the clock timing budgeting and the intra-partition clock latency. The timing graph 600 may also be used for comparison to determine if the design of the partition block meets both the data and clock timing constraints.

As mentioned herein, the clock time budgeting allows for design and analysis of the top level of the chip in parallel with the design and analysis of the lower levels of the hierarchy such as the partition blocks. Accordingly, processes 1114 and 1116 while shown in series in FIG. 11 may be performed in parallel.

At process 1114, each partition block may be implemented (e.g., designed, analyzed, optimized, etc. in detail) independent from the top level and each other partition block in response to the data path and clock timing constraints.

At process 1116, the top chip level may be designed in detail independent from the lower levels of the hierarchy in response to block timing models, the clock delay timing graphs for each partition block.

At process 1118, after the top level and block levels have been implemented, they may be merged together to complete the chip design. The completed chip design may then undergo further analysis so that design goals and specifications are met.

At process 1199, the processing of the integrated circuit design may end.

IC Design Methods with Clock and Data Time Budgeting

Figure 10:
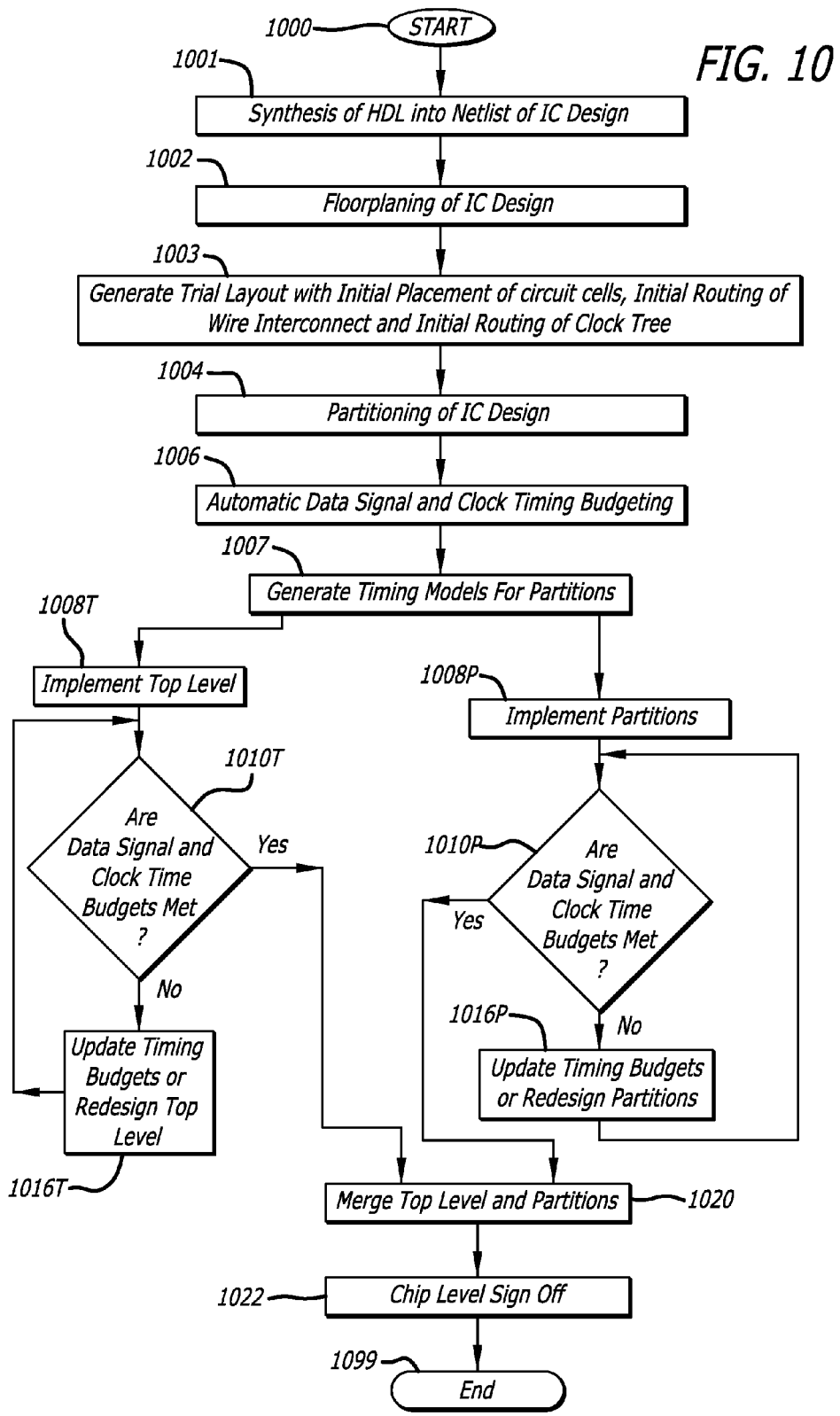
FIG. 10 illustrates a flow chart of an exemplary method of budgeting clock timing.

Referring now to FIG. 10, a flow chart illustrates an exemplary process of integrated circuit design with clock and data timing budget. The process starts at block 1000 and then goes to block 1001.

At block 1001, a high level description of the integrated circuit (IC) design is logically synthesized into a netlist of the IC design. The process then goes to block 1002.

At block 1002, a floor plan for the layout of the integrated circuit design may be planned out. Major logical blocks of the IC design or partitions may be positioned in a floor plan of the layout based on certain constraints during the floor planning process. The process then goes to block 1003.

At block 1003, an initial placement of circuit cells, an initial routing of wire interconnect forming data paths, and an initial clock tree synthesis and routing may be performed to generate a trial layout of the integrated circuit design. This is to better gauge data signal timing delays in wire interconnect in the data paths and clock timing delays in the wire interconnect in the clock paths of the IC design. The process then goes to block 1004.

At block 1004, to ease design and analysis, the integrated circuit design is partitioned into a plurality of partitions by partitioning up the netlist. The partitioning process is responsive to the floor plan and the initial placement of the circuit cells and initial the routing of wire interconnects and clock tree of the trial layout. The initial chip level netlist of the integrated circuit design is partitioned into a hierarchy of a top level and a plurality of partitions (e.g., partition blocks,). The top level includes an initial top level netlist and each partition includes an initial partition netlist. The process then goes to block 1006.

At block 1006, in response to the initial partition netlists and the initial top level of the integrated circuit design, data timing budgets and clock timing budgets for the plurality of partitions and the top level of the integrated circuit design may be automatically generated. The automatically generated timing budgets are saved to a file so that they can be read for later analysis and implementation of the detail design of the partition blocks and top level. The process then goes to block 1007.

At block 1007, a timing model for each of the one or more partitions of the integrated circuit may be generated in response to the one or more partition interfaces specified in the top-level netlist, the data timing budgets and the clock timing budgets. Each timing model includes an intra-partition clock timing constraint for each respective partition. The process then splits up into parallel processes that may be concurrently performed and goes to blocks 1008P and 1008T.

At block 1008P, one or more partition blocks may be implemented in response to the clock timing budgets for the clock paths and the data timing budgets for the data paths. The implementation of each block includes a block level timing analysis of the partition and an optimization the partition block netlist from an initial partition block netlist into an optimized partition block netlist. The partition netlist is optimized to meet constraints and the clock and data timing budgets. In the timing analysis, timing delays are computed for each block/circuit cell along one or more desired data signal paths for data path timing budget analysis. The timing delays contributed by each block are summed up along each selected signal paths entire length from a start point to an end point as it traverses one or more levels of hierarchy of the IC design, in response to the netlist. Timing delays are computed along the clock path for a timing budget analysis. The process may then go to block 1010P.

At block 1010P, a comparison process automatically compares the timing delay along data paths and clock paths with the data time budgets and clock time budgets, respectively. Alternatively, the comparison process 1010P may be a manual comparison process performed by a designer.

Further at block 1010P, a determination may be made by as to whether or not the data and clock timing budgets are being met along the data and clock signal paths. If a timing budget is not being met along a data signal path or a clock signal path, the path may be flagged as failing. A failing path may warrant further timing budgeting analysis to determine where a path is not meeting the data or clock timing budget. A graphical user interface (GUI) as described in U.S. patent application Ser. No. 12/437,096 entitled USER INTERFACE FOR TIMING BUDGET ANALYSIS OF INTEGRATED CIRCUIT DESIGNS filed on May 7, 2009 by inventors Vivek Bhardwaj et al., may be used to analyze a failing path. If the timing budget is not being met along a signal path, a user may elect to update a timing budget or redesign the IC in the next process, block 1016P. If the timing budgets are being met, updating/redesign process of block 1016P can be skipped and goes to process block 1020.

At block 1016P, if timing budgets are not being met (e.g., time delay is over timing budget), the timing budgets for the partitions of the IC design may be selectively updated. More likely, the netlist of the IC design may be updated so that the selected path under analysis will meet the timing budgets.

A failing clock path may be redesigned so that it meets the clock timing budgets. A partition block may be redesigned to reduce an inner clock timing delay along an inner clock path from a clock entry point at a partition boundary to a clock sink. The inner clock path may be redesigned to reduce an inner clock timing delay. Alternatively or conjunctively, an external clock path from the clock source to the clock entry point at the partition boundary may be redesigned to reduce the external clock timing delay. Logic gates clocking a clock in the clock path may be reduced to reduce the clock timing delay. Parasitic resistance and/or parasitic capacitance may be reduced in the clock path to reduce the clock timing delay. The process may then go back to block 1010P to determine if the timing budgets are being met.

At block 1008T, the top level is implemented in response to the initial top level netlist, the top level constraints (physical and timing constraints) or the clock timing budgets for the clock paths and the data timing budgets for the data paths in the top level, and each of the respective timing budgeting models for each partition instantiated into the top level. The implementation of the top level includes a top level timing analysis of the top level netlist and an optimization the top level netlist from an initial top level netlist into an optimized top level netlist.

At block 1010T, a comparison process automatically compares the timing delay along data paths and clock paths in the top level with the data time budgets and clock time budgets, respectively. Alternatively, the comparison process 1010T may be a manual comparison process performed by a designer.

Further at block 1010T, a determination may be made by as to whether or not the data and clock timing budgets are being met along the data and clock signal paths in the top level. If a timing budget is not being met along a data signal path or a clock signal path, the path may be flagged as failing. A failing path may warrant further timing budgeting analysis to determine where a path is not meeting the data or clock timing budget. A graphical user interface (GUI) as described in U.S. patent application Ser. No. 12/437,096 entitled USER INTERFACE FOR TIMING BUDGET ANALYSIS OF INTEGRATE CIRCUIT DESIGNS filed on May 7, 2009 by inventors Vivek Bhardwaj et al., may be used to analyze a failing path. If the timing budget is not being met along a signal path, a user may elect to update a timing budget or redesign the IC in the next process, process block 1016T. If the timing budgets are being met, updating/redesign process of process block 1016T can be skipped and the process goes to process block 1020.

At process block 1016T, if timing budgets are not being met (e.g., time delay is over timing budget), the timing budgets for the top level of the IC design may be selectively updated. More likely, the netlist of the IC design may be updated (optimized) so that the selected path under analysis will meet the timing budgets of the top level.

A failing clock path may be redesigned so that the partition meets the data path clock path timing budgets. The top level may be redesigned to reduce, an external clock path from the clock source to the clock entry point at partition boundaries may be redesigned to reduce the external clock timing delay. Logic gates in the top level clocking or buffering a clock in the clock path may be reduced to reduce the clock timing delay. Parasitic resistance and/or parasitic capacitance may be reduced in the clock path to reduce the clock timing delay in the top level. The process may then go back to block 1010T to determine if the timing budgets are being met in the top level.

At process block 1020, the pluralities of partitions are merged into the top level design and to form a flattened chip level implementation. The flattened chip level may be analyzed so determine if the chip level timing constraints are being met. The process may then go to process block 1022.

At process block 1022, if the flattened chip level design or implementation meets the chip level constraints, the chip level design may be signed off. If the data path and clock path time budgeting is sufficiently accurate, the flattened chip level netlist may meet chip level timing constraints with a single optimization of the top level and each partition block to achieve a single pass design flow. That is, to achieve a single pass design flow, the data path and clock path time budgeting is sufficiently accurate so that the flattened chip level netlist meets chip level timing constraints without more than a single optimization of the top level or the partition block.

One or more of the processes may be repeated if the netlist of the IC design is updated or the budgets are updated. If constraints are met, repetition of a step may not be needed and the process may go to block 1099 and end.

Single Pass Parallel Flow Design Methodology

Previously, the design flow process to achieve signal timing goals was repetitive (not single pass) and difficult to partition into parallel independent jobs. Without accurate clock network delays, the data timing budgets generated for partitions could be poor, such that timing closure may not be achieved. The timing design flow process often included rebudgeting and repartitioning after physical clock tree synthesis phase to achieve timing closure. Without clock latency modeling, the library models generated by data time budgeting are mostly useless during clock tree synthesis at the top level. Accurately modeling the clock latency is important so that time budgeting information remains valid for an accurate top level analysis during clock tree synthesis of the chip. Otherwise, designers need to wait for all partitioned blocks to have timing closure before starting top level clock tree construction and top level timing analysis.

At the block level, without clock latency modeling, two different sets of timing constraints are needed for partitioned blocks—an initial set of timing constraints prior to clock tree synthesis and a revised set of timing constraints post clock tree synthesis. With the two different timing constraints, a repetitive iteration in the design of the partition block may be needed.

Clock budgeting/division and modeling fills gaps in the design flow so that a single pass timing closure with partitioned blocks being analyzed in parallel together may be achieved. Parallel timing analysis of the top chip level design and the partitioned blocks in a hierarchy can speed turn around time. Achieving rapid timing closure can also speed time to market of new circuit designs. A fast clock tree synthesis (CTS), such as described in U.S. Pat. No. 7,467,367, can be performed early in the design flow to synthesize an initial clock tree of a plurality of clock paths into each partition to get estimated clock budgets. The clock tree path within each partition may be saved to a CTS file for each respective partition that contains the intra-partition clock latency determined from the fast CTS. Otherwise, intra-partition clock latency for each partition block may be supplied by the expert user/designer, which would be then used in the clock budgeting process.

Figure 3:
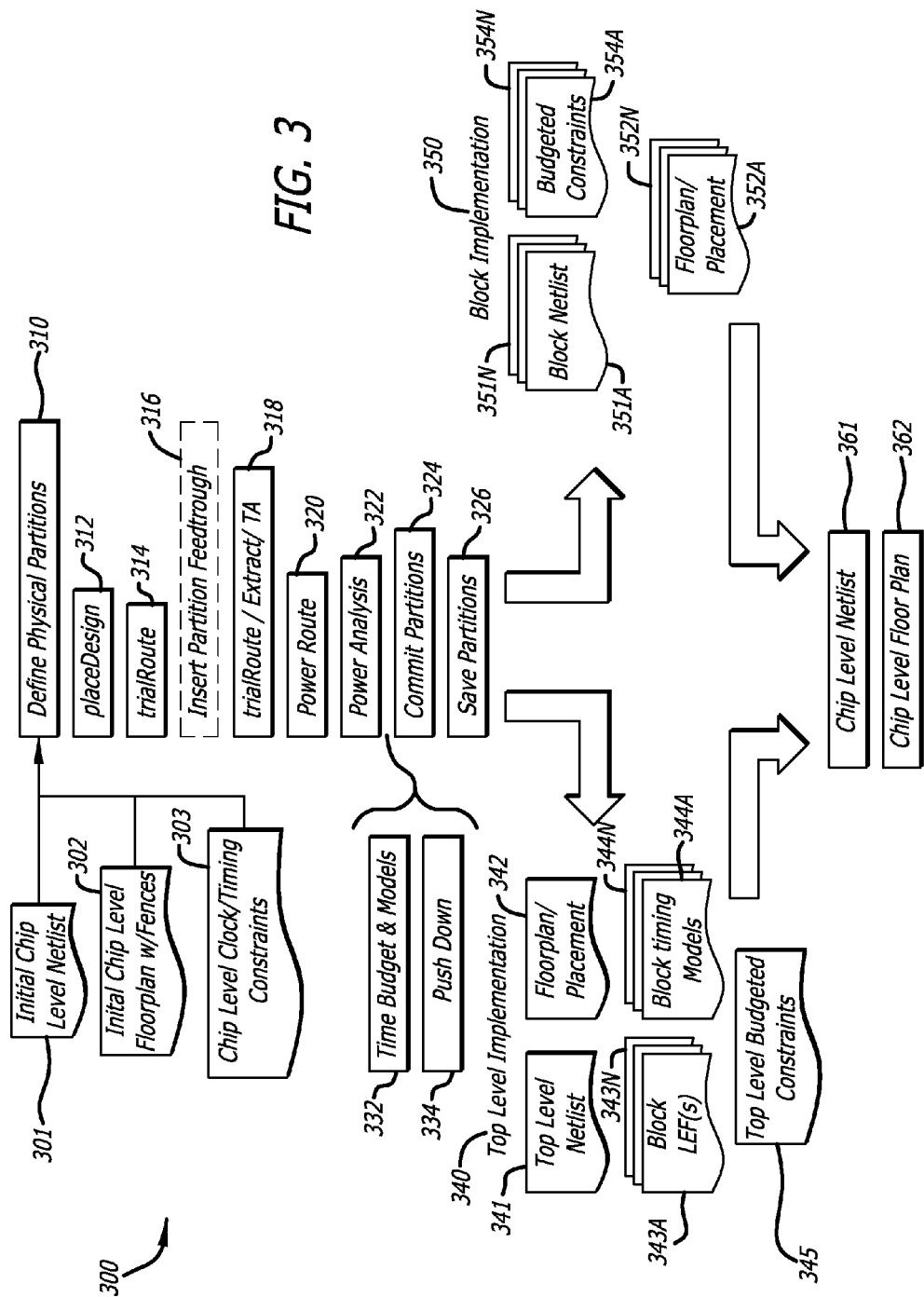
FIG. 3 illustrates an exemplary design methodology for timing closure of block level design and top level design of an integrated circuit.

FIG. 3 illustrates a hierarchical design flow 300 for timing closure that employs the clock latency modeling techniques described herein. The clock latency modeling improves the time budgeting process 332 so that the design flow 300 may be implemented. The hierarchical design flow is non-iterative with a parallel flow implementation that may be achieved in a single pass with the push of a single button. The hierarchical flow 300 is composed of a top level implementation 340 and a block level implementation 350 to achieve rapid design closure in circuit designs that pose capacity challenges in a flat implementation. The entire top level implementation and block level implementation may be signed off without further iterations of the hierarchical design flow. With a parallel design flow, computers located in multiple geographical locations can perform the design flow with little to no interaction regarding environmental embodiments.

In FIG. 3, a database of an initial flat chip level netlist 301, an initial chip level floorplan 302 with any fences, and flat chip level timing constraints 303 are read and used in the sequence of the hierarchical design flow 300. The flat chip level timing constraints 303 may include chip-level clock path timing constraints and chip-level data path timing constraints in a design constraint file.

At process 310, with the netlist, floorplan, and timing information, the top chip is partitioned into sub-chips (also referred to as partitions, partitioned blocks, chiplets, or blocks). The partitioning of the design breaks up the tasks of achieving timing closure of the integrated circuit design between the top chip level and the lower levels of the partitioned blocks. This process forms a top level netlist and a plurality of partition block netlists that can be independently implemented into circuit mask data. With the top level netlist partitioned from the partition block, the top level chip design can be implemented independent of the implementation of the partition blocks. The design flow can then proceed in parallel to (i) implement and achieve timing closure of a top level implementation 340 of the circuit design; and (ii) implement and achieve timing closure of block level implementations 350 of the circuit design.

Implementing a partition block includes a first netlist optimization (e.g., gate level synthesis) of the initial partition netlist after the partition process 310 but prior to clock tree synthesis in response to the initial partition netlist and the clock and data path partition constraints formed during the clock and data time budgeting process 332. Implementing the top level chip design includes a first netlist optimization of the initial top-level netlist after the partition process 310 in response to the initial top-level netlist and the clock and data path top-level constraints formed during the clock and data time budgeting process 332.

At process 312, an initial placement of the circuits forming the top chip level and the circuits forming each of the blocks in the various levels of hierarchy may be made. After the initial placement of the design, the process may go to process 314.

At process 314, a trial routing of interconnect is made for the top level of the chip and/or the partition blocks at the various levels of hierarchy.

An optional process 316 may then be performed next. At process 316, partition feed-throughs may be routed so that signals are passed through a shorter path and possibly experience less parasitic resistance and capacitance loading.

At process 318, a second trial routing may be performed with an extraction of parasitics in order to perform an initial timing analysis. A second round of routing may be recommended after pin assignment. This second round of routing honors the pin assignment that was made. The timing analysis of each partition block design is used to verify that the timing constraints at the block level are being met. The timing analysis of the top level chip design is used to verify that the timing constraints at the top chip level are being met.

At process 320, a routing of the power and ground interconnections is made between partitions at the top level and within the partitions at the lower block level.

At process 322, a power analysis may then be performed on the top level and the block level partitions to be sure that the power and ground interconnections are sufficiently wide with low resistance to handle the global and local power consumption.

Before committing partitions at process 324, the plurality of partitions are designed in detail and analyzed through processes 332-334.

At process 332, time budgeting of the hierarchy of the plurality of partitions is undertaken to determine data path timing constraints and clock path timing constraints. Timing models for each of the partition blocks. If partition models are available, the time budgeting of the top level may be used to implement the top level design.

At process 334, the time budgets can be pushed down into the lower levels of the hierarchy from top level down to the lowest cell level to further design lower level partitions.

As described herein, the time budgeting process is a process of generating timing constraints for the top level of the chip and the individual partition blocks determined during partitioning. Along with the constraints, the time budgeting process also generates timing budget models of the individual blocks. For implementation of the top level, the top level constraints and the block models are used together to implement the design of the top level of the integrated circuit, independent of the implementation of the one or more blocks. The top level of the chip may exclude the partitioned implementation of the blocks (e.g., block netlists 351A-351N) and instead utilize block timing models 344A-344N to implement the top level and obtain timing closure thereof. In this manner, the top level of the chip (e.g., top level netlist 341) may be designed independently of the design of the partitioned blocks. Similarly, the partitioned blocks (e.g., block netlists 351A-351N) may be designed independently of the top level of the chip. Subsequently the implementation of partitioned blocks are merged into the implementation of the top level to form the flattened chip level implementation or design including an optimized chip level netlist 361 and optimized chip level floor plan 362.

For N partitioned blocks, the time budgeting process generates timing budgeted constraints 354A-354N for initial block netlists. The initial block netlists are optimized in response to the timing budgeted constraints 354A-354N into respective block netlist 351A-351N with floorplan/placement 352A-352N for the block level implementation 350. In addition to the data path and clock path timing constraints, the time budgeting process 332 also generates block timing models 344A-344N for each block 351A-351N. Together with the top level constraints 303, the block timing models 344A-344N are used for timing closure of the top level implementation 340 of the chip.

The time budgeting process also generates the top level timing budgeted constraints 345 as well as the block level timing models 344A-344N. The initial top level netlist is optimized into the top level netlist 341 with the floorplan/placement 342 in response to the top level timing budgeted constraints 345 and the block level timing models 344A-344N.

Each of the timing budgeted constraint files 354A-354N for each respective partition block 351A-351N includes an internal clock delay number representing the clock delay within the partition block and an external clock delay number representing the clock delay external to the partition block. Thus, the total chip clock delay is divided into external clock delay and internal clock delay across a partition boundary. The partition boundary groups the circuits within a partition block into a set of circuits such as shown in FIG. 4A. The external clock delay is a source latency in the block constraint file 354A-354N. The internal clock delay is a network latency in the block constraint file 354A-354N. For the top level implementation 340, the internal clock delay number is included in the block timing model 344A-344N for each respective block netlist 351A-351N.

At process 324, after the initial partition netlist have been formed and budgeted for timing, the partition (e.g., the block netlist 351A-351N) can be committed in the overall integrated circuit design.

At process 326, the partition is saved to the design data base. Further design and analysis of the integrated circuit design may occur thereafter. The top level and the block level partitions can be independently implemented and concurrently implemented in parallel.

The design flow 300 may theoretically flow seamlessly. After saving the partitions 326, the block(s) and the top level of the chip can be independently implemented in parallel up until a post route phase that is performed on the chip level design. That is, with the clock timing latency being modeled in the block level time budgeting models, the top level netlist 341 and the block level netlists 351A-351N can be implemented independently but concurrently in parallel together.

With the individual block netlists 351A-351N and the top level netlist 341 being implemented, they can be merged or assembled back together to form an optimized chip level netlist 361 and a chip level floor plan 362.

Furthermore, with the clock timing latency being modeled, post route sign off timing can be achieved after block level netlist and the top level netlist of the design is assembled together into the chip level netlist 361 and a chip level floor plan 362 without a need to re-partition the design.

In an alternate embodiment, the block level implementation 350 may use a single constraint file 351A to store the constraints for each and every block.

CONCLUSION

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It may prove convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing", "computing", "calculating", "generating", "determining", "displaying", "planning", "synthesizing", "partitioning", "placing", "routing", "scaling", "color-coding", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention also relate to an apparatus for performing the operations and functions described herein. This apparatus may be specially constructed for the required purposes, or it may comprise a general-purpose computer selectively activated or reconfigured by a computer program stored in a storage device of the computer. When implemented as a computer program in software, the elements of the embodiments of the invention are essentially the code segments or instructions to perform the processes and functions. The algorithm processes may be written in a computer programming language and then converted to machine code segments, loaded into a computer, and then executed to perform the processes in an automated fashion. The program or code segments can be stored in a processor, computer, or machine readable medium such as a storage device. The code segments may also be downloaded via computer networks such as the Internet, Intranet, etc and stored in the processor, computer, or a storage device (e.g., a machine readable medium).

The processor, computer or machine readable medium may include any mechanism for storing or transmitting information in a form readable by a machine (e.g., a processor or computer). For example, machine-readable medium includes semiconductor storage media, magnetic disk storage media; optical storage media, or any type of media suitable for storing electronic instructions that may be coupled to a machine or a computer; such as, but not limited to, any type of disk including floppy disks, optical disks, CD-ROMs, magnetic-optical disks, read-only memories (ROMs), random access memories (RAMs), flash memory devices, EPROMs, EEPROMs, magnetic or optical cards. The computer program code may be transmitted via electrical, optical, acoustical or other form of propagated signals (e.g., carrier waves, infrared signals, digital signals, etc.) for storage into a computer or machine readable medium.

The processes presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description herein. Additionally, the embodiments of the invention are not described with reference to any particular programming language. It will be appreciated that a variety of programming languages may be used to implement the teachings of the invention as described herein.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications, variations, and adaptations may readily be understood after reading through the disclosure. Rather, the embodiments of the invention should be construed according to the claims that follow below.

What is claimed is:

1. A method of designing an integrated circuit, the method comprising:
   partitioning an integrated circuit design into a hierarchy of a top level and a plurality of partitions, wherein the top level includes an initial top level netlist and each partition includes an initial partition netlist;
   receiving data path timing budgets and clock path timing budgets for each of the plurality of partitions of the integrated circuit design;
   generating a timing budget model of each partition in response to the respective data path timing budgets and clock path timing budgets, wherein each timing budget model includes an intra-partition clock timing constraint modeled with data path timing constraints for each respective partition for independent implementation of the top level; and
   wherein one or more of the partitioning, the receiving, and the generating are performed with a processor.

2. The method of claim 1, further comprising:
   independently implementing each partition in response to the respective initial partition netlist and any respective partition constraints without waiting for implementation of the top level or any other partition, wherein the implementing of each partition includes a timing analysis and an optimization of each initial partition netlist into an optimized partition netlist.

3. The method of claim 2, wherein the timing analysis includes:
   computing data path timing delays in the integrated circuit design; and
   analyzing if the data path timing delays in the integrated circuit design meet the data path timing budges in response to the intra-partition clock timing constraint of each respective partition.

4. The method of claim 2, wherein
   the timing analysis of each partition includes
   computing timing delays along a data path.

5. The method of claim 4, wherein
   each clock timing budget includes a clock source latency and an intra partition clock latency along a clock path, the clock source latency over an external clock path portion of the clock path from a clock source to a clock entry point at a partition boundary, the intra partition clock latency over an inner clock path portion of the clock path from the clock entry point at the partition boundary to a clock sink; and if the timing analysis of a partition determines that the data timing budget is not met along a data path, then the method includes
   updating the data timing budget to a new data timing budget so that the failing data path meets the new data timing budget.

6. The method of claim 4, wherein
each clock timing budget includes a clock source latency and an intra partition clock latency along a clock path, the clock source latency over a portion of the clock path from a clock source to a clock entry point at a partition boundary, the intra partition clock latency over a portion of the clock path from the clock entry point at the partition boundary to a clock sink; and
if the timing analysis of a partition determines that the data timing budget is not met along a failing data path, then the method includes
   redesigning the partition with the failing data path such that the one or more data paths in the partition all meet the data timing budget.

7. The method of claim 5, wherein
the updating of the data timing budget to the new data timing budget includes
   increasing the data timing budget for a failing data path of the partition block so that the data timing delay along the failing data path meets the new clock timing budget.

8. The method of claim 6 wherein
the redesigning of the partition includes redesigning the partition to reduce the intra-partition clock timing delay along an inner clock path portion.

9. The method of claim 6, wherein
the redesigning of the partition includes redesigning the inner clock path portion of the failing data path to reduce intra-partition clock timing delay.

10. The method of claim 6, wherein
the redesigning of the partition includes reducing a parasitic load on the external clock path portion to reduce external clock timing delay.

11. The method of claim 1, further comprising:
independently implementing the top level of the integrated circuit design in response to the initial top level netlist and the timing budget models of the plurality of partitions without waiting for implementation of any partition, wherein the implementing of the top level includes a timing analysis and an optimization of the initial top level netlist into an optimized top level netlist.

12. The method of claim 11, wherein
the implementing of the top level design further includes a synthesis of clock paths in the top level forming a clock tree from a clock source to partition boundaries of the plurality of partitions; and
the timing analysis of the top level netlist is in response to the respective timing budget model for each partition.

13. The method of claim 1, further comprising:
independently implementing the top level of the integrated circuit design in response to the initial top level netlist and the timing budget models of the plurality of partitions prior to implementation of any partition, wherein the implementing of the top level includes a timing analysis and an optimization of the initial top level netlist into an optimized top level netlist.

14. The method of claim 1, further comprising:
prior to implementing the top level, synthesizing an initial clock tree including a plurality of clock paths into each partition;
in response to the initial clock tree, computing a clock source latency and an intra-partition clock latency to automatically generate the clock path timing budgets for each of the plurality of partitions; and
automatically generating the data path timing budgets.

15. The method of claim 1, further comprising:
prior to partitioning:
   logically synthesizing a high level description of the integrated circuit design into the netlist;
   planning an initial floor plan for the layout of the integrated circuit design; and
   initially placing circuit cells and routing data paths and clock paths with wire interconnect to generate a trial layout of the integrated circuit design.

16. A circuit design system comprising:
a computer to execute instructions, the computer including a storage device to store instructions for execution;
the storage device having instructions stored therein to adapt the computer to:
   partition an integrated circuit design into a hierarchy of a top level and a plurality of partitions, wherein the top level includes an initial top level netlist and each partition includes an initial partition netlist;
   receive data path timing budgets and clock path timing budgets for each of the plurality of partitions of the integrated circuit design; and
   generate a timing budget model of each partition in response to the respective data path timing budgets and clock path timing budgets, wherein each timing budget model includes an intra-partition clock timing constraint modeled with data path timing constraints for each respective partition for independent implementation of the top level.

17. The circuit design system of claim 16, wherein
the storage device has further instructions stored therein to further adapt the computer to
   independently implement each partition in response to the respective initial partition netlist and any respective partition constraints without waiting for implementation of the top level or any other partition, wherein the implementation of each partition includes a timing analysis and an optimization of each initial partition netlist into an optimized partition netlist.

18. The circuit design system of claim 17, wherein
the storage device has further instructions stored therein to adapt the computer to perform the timing analysis including instructions to
   compute data path timing delays in the integrated circuit design; and
   analyze if the data path timing delays in the integrated circuit design meet the data path timing budges in response to the intra-partition clock timing constraint of each respective partition.

19. The circuit design system of claim 16, wherein
the storage device has further instructions stored therein to further adapt the computer to
   independently implement the top level of the integrated circuit design in response to the initial top level netlist and the timing budget models of the plurality of partitions without waiting for implementation of any partition, wherein the implementation of the top level includes a timing analysis and an optimization of the initial top level netlist into an optimized top level netlist.

20. The circuit design system of claim 16, wherein
the storage device has further instructions stored therein to further adapt the computer to
independently implement the top level of the integrated circuit design in response to the initial top level netlist and the timing budget models of the plurality of partitions prior to implementation of any partition, wherein the implementation of the top level includes a timing analysis and an optimization of the initial top level netlist into an optimized top level netlist.

21. The circuit design system of claim 19, wherein
the implementation of the top level design further includes a synthesis of clock paths in the top level forming a clock tree from a clock source to partition boundaries of the plurality of partitions, and,
the timing analysis of the top level netlist is in response to the respective timing budget model for each partition.

22. The circuit design system of claim 16, wherein
the storage device has further instructions stored therein to further adapt the computer to
synthesize an initial clock tree including a plurality of clock paths into each partition prior to implementation of the top level;
compute a clock source latency and an intra-partition clock latency to automatically generate the clock path timing budgets for each of the plurality of partitions in response to the initial clock tree; and
automatically generate the data path timing budgets.

23. The circuit design system of claim 16, wherein
the storage device has further instructions stored therein to further adapt the computer to
logically synthesize a high level description of the integrated circuit design into the netlist prior to partitioning;
plan an initial floor plan for the layout of the integrated circuit design prior to partitioning; and
initially place circuit cells and route data paths and clock paths with wire interconnect to generate a trial layout of the integrated circuit design prior to partitioning.

24. A machine readable product for designing an integrated circuit, the machine readable product comprising:
a machine readable storage device having stored therein machine readable instructions to:
partition an integrated circuit design into a hierarchy of a top level and a plurality of partitions, wherein the top level includes an initial top level netlist and each partition includes an initial partition netlist;
receive data path timing budgets and clock path timing budgets for each of the plurality of partitions of the integrated circuit design; and
generate a timing budget model of each partition in response to the respective data path timing budgets and clock path timing budgets, wherein each timing budget model includes an intra-partition clock timing constraint modeled with data path timing constraints for each respective partition for independent implementation of the top level.

25. The machine readable product of claim 24, wherein
the machine readable storage device has further stored therein machine readable instructions to
independently implement each partition in response to the respective initial partition netlist and any respective partition constraints without waiting for implementation of the top level or any other partition, wherein the implementation of each partition includes a timing analysis and an optimization of each initial partition netlist into an optimized partition netlist.

26. The machine readable product of claim 25, wherein
the machine readable storage device has further stored therein machine readable instructions to perform the timing analysis including instructions to
compute data path timing delays in the integrated circuit design; and
analyze if the data path timing delays in the integrated circuit design meet the data path timing budges in response to the intra-partition clock timing constraint of each respective partition.

27. The machine readable product of claim 24, wherein
the machine readable storage device has further stored therein machine readable instructions to
independently implement the top level of the integrated circuit design in response to the initial top level netlist and the timing budget models of the plurality of partitions without waiting for implementation of any partition, wherein the implementation of the top level includes a timing analysis and an optimization of the initial top level netlist into an optimized top level netlist.

28. The machine readable product of claim 27, wherein
the implementation of the top level design further includes a synthesis of clock paths in the top level forming a clock tree from a clock source to partition boundaries of the plurality of partitions, and,
the timing analysis of the top level netlist is in response to the respective timing budget model for each partition.

29. The machine readable product of claim 24, wherein
the machine readable storage device has further stored therein machine readable instructions to
independently implement the top level of the integrated circuit design in response to the initial top level netlist and the timing budget models of the plurality of partitions prior to implementation of any partition, wherein the implementation of the top level includes a timing analysis and an optimization of the initial top level netlist into an optimized top level netlist.

30. The machine readable product of claim 24, wherein
the machine readable storage device has further stored therein machine readable instructions to
synthesize an initial clock tree including a plurality of clock paths into each partition prior to implementation of the top level;
compute a clock source latency and an intra-partition clock latency to automatically generate the clock path timing budgets for each of the plurality of partitions in response to the initial clock tree; and
automatically generate the data path timing budgets.

31. The machine readable product of claim 24, wherein
the machine readable storage device has further stored therein machine readable instructions to
logically synthesize a high level description of the integrated circuit design into the netlist prior to partitioning;
plan an initial floor plan for the layout of the integrated circuit design prior to partitioning; and
initially place circuit cells and route data paths and clock paths with wire interconnect to generate a trial layout of the integrated circuit design prior to partitioning.

* * * * *